(12) United States Patent
Schneider et al.

(10) Patent No.: US 9,752,905 B2
(45) Date of Patent: Sep. 5, 2017

(54) FLUID TRANSPORT SYSTEM INCLUDING A FLOW MEASUREMENT SYSTEM AND A PURGE SYSTEM

(71) Applicant: General Electric Company, Schenectady, NY (US)

(72) Inventors: Carsten Michael Schneider, Bavaria (DE); Erik Mele, Oslo (NO); Christian Aalburg, Bavaria (DE); Andreas Herrig, Bavaria (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/970,425

(22) Filed: Dec. 15, 2015

(65) Prior Publication Data
US 2017/0167903 A1    Jun. 15, 2017

(51) Int. Cl.
*G01F 1/46* (2006.01)
*G01F 1/34* (2006.01)

(52) U.S. Cl.
CPC ..................... *G01F 1/34* (2013.01)

(58) Field of Classification Search
None
See application file for complete search history.

(56) References Cited

U.S. PATENT DOCUMENTS

| | | | | |
|---|---|---|---|---|
| 4,498,347 A | * | 2/1985 | Grantham | G01F 1/46 73/861.66 |
| 4,959,990 A | * | 10/1990 | Morris | G01F 1/46 73/198 |
| 5,199,306 A | * | 4/1993 | Hunter | G01F 1/44 73/861.63 |
| 5,463,908 A | * | 11/1995 | Rosolia | G01N 1/2035 73/863.83 |

(Continued)

FOREIGN PATENT DOCUMENTS

CN    102252715 A    11/2011

OTHER PUBLICATIONS

Depolt et al.,"Investigation on optimizing the design process of multi-hole pressure probes for transonic flow with panel methods", Instrumentation in Aerospace Simulation Facilities, 1991. ICIASF '91 Record., International Congress on, pp. 1-9, Oct. 27-31, 1991, Rockville, MD.

(Continued)

*Primary Examiner* — Harshad R Patel
(74) *Attorney, Agent, or Firm* — Pabitra K. Chakrabarti (57) ABSTRACT

A fluid transport system includes a housing defining a passageway for fluid to flow through the fluid transport system and a probe extending in the passageway. The probe includes a first end defining a plurality of sensing ports for the fluid to flow into the probe and a second end opposite the first end. The fluid flows through a plurality of conduits and a plurality of tubes. A differential pressure sensor is in fluid (Continued)

communication with the plurality of tubes such that the differential pressure sensor determines a differential pressure of the fluid in the plurality of tubes. A purge system is in fluid communication with the plurality of tubes. The purge system includes a source of purge liquid and is configured to direct the purge liquid through the plurality of tubes.

20 Claims, 4 Drawing Sheets

(56) References Cited

U.S. PATENT DOCUMENTS

| | | | |
|---|---|---|---|
| 6,203,502 B1* | 3/2001 | Hilgendorf | A61B 5/087 128/200.11 |
| 6,941,805 B2 | 9/2005 | Seidel et al. | |
| 7,010,970 B2 | 3/2006 | Rediniotis et al. | |
| 7,752,929 B2* | 7/2010 | Kurz | G01F 1/46 73/863 |
| 7,942,065 B2 | 5/2011 | Xie | |
| 8,800,393 B2 | 8/2014 | Atkinson et al. | |
| 2008/0250762 A1* | 10/2008 | Brown | B01D 46/02 55/283 |
| 2012/0298801 A1* | 11/2012 | Ellison | B64D 43/02 244/129.1 |

OTHER PUBLICATIONS

Blair R Chalpin, "Turbine Testing With High-Line, Low Differential Pressure Measurement", ASME 1997 International Gas Turbine and Aeroengine Congress and Exhibition, Paper No. 97-GT-527, vol. 4, Paper No. 97-GT-527, pp. V004T15A039; pp. 5, Jun. 2-5, 1997, Orlando, Florida, USA.

\* cited by examiner

FLUID TRANSPORT SYSTEM INCLUDING A FLOW MEASUREMENT SYSTEM AND A PURGE SYSTEM

BACKGROUND

The field of the disclosure relates generally to fluid transport systems and, more particularly, to fluid transport systems including flow measurement systems for measuring characteristics of multiphase fluid flows.

Fluid transport systems include fluid processing equipment, such as pumps and compressors, to facilitate fluid flow through the fluid transport systems. Equipment design and the performance of fluid transport systems are enhanced by understanding the characteristics of fluid flow through the fluid transport systems. Some fluid characteristics are estimated for various equipment systems using computational fluid dynamics tools. However, the estimates are sometimes erroneous or based on models that do not represent the real-time operation of the fluid processing equipment. Accordingly, at least some known fluid transport systems include flow measurement systems for measuring the characteristics of the fluid flow. For example, flow angle probes are used to detect the flow angle characteristics of fluid flowing within the fluid transport system.

In at least some known fluid transport systems, fluid is transported in a multiphase state, which presents additional challenges for measuring characteristics of the fluid. The multiphase fluid flow introduces error in measurements taken by known flow measurement systems. For example, gas of the multiphase flow is sometimes entrained within passageways coupled to a pressure transducer of a flow measurement system. Within the passageways, pressure differences due to unknown fluid columns and surface tension between the fluids (e.g., gas and liquid) result in error in the pressure measurements. Therefore, it is necessary for a flow measurement system to account for the gas phase portion of a multiphase flow in order to increase accuracy of flow measurements. At least some known fluid transport systems operate at relatively high pressures when handling multiphase fluid flow. For example, some fluid transport systems have operating pressures of approximately 200 bars. Accordingly, the flow measurement systems have to withstand high operating pressures. In addition, the flow measurement systems have to be accurate in a low relative pressure range to capture the variations in dynamic pressure of multiphase fluid flow.

BRIEF DESCRIPTION

In one aspect, a fluid transport system is provided. The system includes a housing defining a passageway for fluid to flow through the fluid transport system and a probe extending in the passageway. The probe includes a first end defining a plurality of sensing ports for the fluid to flow into the probe and a second end opposite the first end. A plurality of conduits extend between the first end and the second end and are coupled to the plurality of sensing ports such that the fluid flows through the plurality of conduits. A plurality of tubes are coupled to the plurality of conduits such that the fluid flows through the plurality of tubes. A differential pressure sensor is in fluid communication with the plurality of tubes such that the differential pressure sensor determines a differential pressure of the fluid in the plurality of tubes. The system further includes a purge system in fluid communication with the plurality of tubes. The purge system includes a source of purge liquid and is configured to direct the purge liquid through the plurality of tubes.

In another aspect, a flow measurement system is provided. The system includes a probe configured to contact a flowing fluid. The probe includes a first end defining a plurality of sensing ports for the fluid to flow into the probe and a second end opposite the first end. A plurality of conduits extend between the first end and the second end and are coupled to the plurality of sensing ports such that the fluid flows through the plurality of conduits. A plurality of tubes are coupled to the plurality of conduits such that the fluid flows through the plurality of tubes. A differential pressure sensor is in fluid communication with the plurality of tubes such that the differential pressure sensor determines a differential pressure of the fluid in the plurality of tubes. A purge system is in fluid communication with the plurality of tubes. The purge system includes a source of purge liquid and is configured to direct the purge liquid through the plurality of tubes.

In yet another aspect, a method of measuring a characteristic of a fluid flow is provided. The method includes positioning a probe in the fluid flow such that fluid enters conduits of the probe through sensor ports. A plurality of tubes in fluid communication with the conduits are purged with a purge liquid from a purge liquid source. A differential pressure between the fluid in the plurality of tubes is measured using a differential pressure sensor in fluid communication with the plurality of tubes.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The fluid transport systems described herein include a flow measurement system to measure characteristics of fluid flow through the fluid transport systems. The flow measurement system includes a probe, a sensor, a plurality of tubes, and a purge system. The purge system is coupled to the plurality of tubes and configured to direct a purge fluid through the plurality of tubes. In particular, the purge system directs liquid through the plurality of tubes to remove gas entrained in the plurality of tubes and facilitate the sensor accurately measuring characteristics of the fluid flow. In some embodiments, the sensor includes a pressure transducer that measures pressure accurately within a low-pressure range and withstands high operating pressures to facilitate measurement of a multiphase fluid flow through the fluid transport system.

Figure 1:
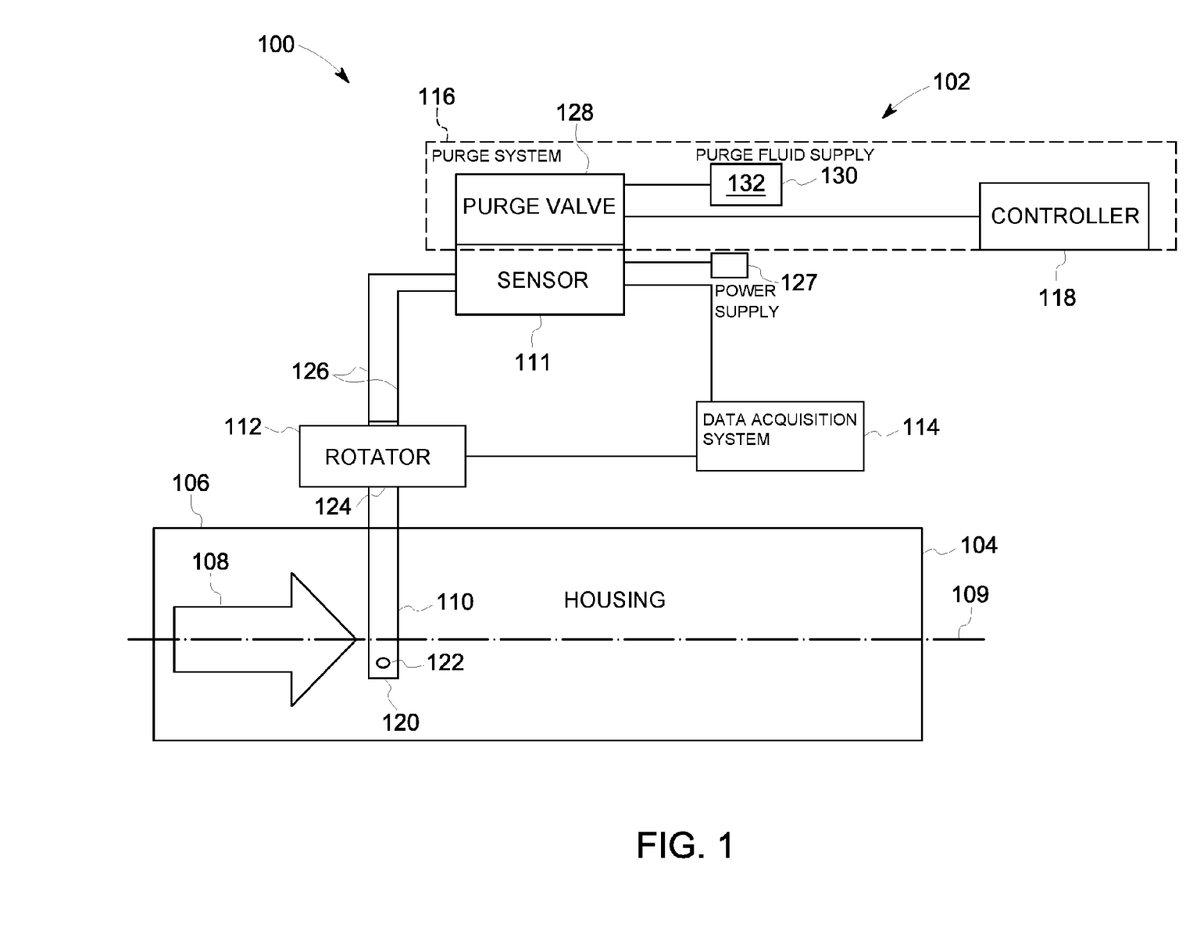
FIG. 1 is a schematic view of an exemplary fluid transport system including a flow measurement system.

FIG. 1 is a schematic view of a fluid transport system 100 including a flow measurement system 102. In alternative embodiments, fluid transport system 100 is any system that transports fluid including, without limitation, engines, pumping systems, rotary machines, turbomachines, turbines, and any other systems through which fluid flows. In the exemplary embodiment, fluid transport system 100 includes a housing 104 defining a passageway 106 for fluid 108 to flow through fluid transport system 100. An axis 109 extends through passageway 106. Fluid 108 is a multiphase fluid including fluid in gaseous and liquid states. In alternative embodiments, fluid 108 is any fluid that enables fluid transport system 100 to operate as described herein. In the exemplary embodiment, flow measurement system 102 extends at least partially into passageway 106 such that fluid 108 contacts a portion of flow measurement system 102.

Flow measurement system 102 includes a probe 110, a sensor 111, a rotator 112, a data acquisition system 114, a purge system 116, and a controller 118. In alternative embodiments, flow measurement system 102 includes any components that enable flow measurement system 102 to operate as described herein. In the exemplary embodiment, probe 110 includes a first end 120 defining a sensor port 122 and a second end 124 opposite first end 120. First end 120 of probe 110 extends into passageway 106 such that fluid 108 contacts first end 120 and flows into sensor port 122. Second end 124 is coupled to rotator 112 such that at least a portion of probe 110 is rotatable. In alternative embodiments, rotator 112 is omitted. In the exemplary embodiment, a plurality of flexible tubes 126 are coupled to second end 124 of probe 110. Flexible tubes 126 extend between and fluidly couple probe 110 and sensor 111.

In the exemplary embodiment, sensor 111 includes a pressure transducer to measure a pressure of fluid 108. A power supply 127 is coupled to sensor 111 to provide power to sensor 111. In alternative embodiments, sensor 111 includes any sensors that enable flow measurement system 102 to operate as described herein. In the exemplary embodiment, data acquisition system 114 is coupled to and communicates with sensor 111 such that data acquisition system 114 receives signals relating to the sensed characteristic from sensor 111. Data acquisition system 114 determines a value of the sensed characteristic based on the signals. For example, in some embodiments, data acquisition system 114 determines a differential pressure. In alternative embodiments, data acquisition system 114 determines any values that enable fluid transport system 100 to operate as described herein.

In the exemplary embodiment, purge system 116 includes a plurality of purge valves 128 and a purge fluid supply 130. Purge system 116 is coupled to flexible tubes 126 such that purge fluid 132 from purge fluid supply 130 flows into flexible tubes 126. In the exemplary embodiment, purge fluid 132 is a liquid, such as water. Using a liquid as purge fluid 132 facilitates purge fluid 132 removing gas from flexible tubes 126. In alternative embodiments, purge fluid 132 is any fluid that enables fluid transport system 100 to operate as described herein. In the exemplary embodiment, purge system 116 maintains purge fluid 132 at a greater pressure than fluid 108 to facilitate purge fluid 132 purging fluid 108 from flow measurement system 102. In some embodiments, purge fluid 132 has a pressure that is greater than pressure of fluid 108 by an amount in a range between about 0.1 bar and about 10 bars. In alternative embodiments, purge fluid 132 has any pressure that enables fluid transport system 100 to operate as described herein. In the exemplary embodiment, purge valves 128 control the flow of purge fluid 132 from purge fluid supply 130 into flexible tubes 126. After flowing through flexible tubes 126, purge fluid 132 flows from flexible tubes 126 into probe 110. Purge valves 128 are configured such that purge fluid 132 flows substantially the entire length of flexible tubes 126 between probe 110 and sensor 111.

In some embodiments, purge system 116 is configured to direct purge fluid 132 through flexible tubes 126 prior to sensor 111 measuring characteristics of fluid 108 and purging is repeated prior to successive measurements such that a sequential pattern of purging and measuring is followed. In further embodiments, purge system 116 is configured to direct purge fluid 132 through flexible tubes 126 continuously as sensor 111 measures characteristics of fluid 108. In some embodiments, purge system 116 is configured to inhibit purge fluid 132 flowing into probe 110 when purge fluid 132 is directed through flexible tubes 126. For example, in some embodiments, purge system 116 includes at least one T-coupling between flexible tubes 126 and probe 110 to allow purge system 116 to direct purge fluid 132 through flexible tubes 126 without purge fluid 132 flowing into probe 110. In alternative embodiments, purge system 116 is configured in any manner that enables fluid transport system 100 to operate as described herein.

Also, in the exemplary embodiment, controller 118 is coupled to and controls purge system 116. In particular, controller 118 is electrically coupled to purge system 116 such that controller 118 sends signals to purge valves 128 relating to the actuation of purge valves 128. Controller 118 is configured to regulate purge valves 128 from a closed position to an open position and from the open position to the closed position In operation of fluid transport system 100, fluid 108 flows through passageway 106 and contacts probe 110. At least a portion of fluid 108 flows into sensor port 122 and through probe 110 from first end 120 to second end 124. Fluid 108 flows from probe 110 to flexible tubes 126 and is carried to sensor 111. Prior to and/or simultaneously with sensor 111 measuring a characteristic of fluid 108, purge system 116 directs purge fluid 132 through flexible tubing 126 and probe 110. Sensor 111 measures a characteristic of fluid 108 and sends a signal to data acquisition system 114. Data acquisition system 114 sends a signal to rotator 112 causing rotator 112 to rotate. In some embodiments, steps of the process are reiterated until probe 110 is aligned with the flow direction of fluid 108 using a nulling technique.

Figure 2:
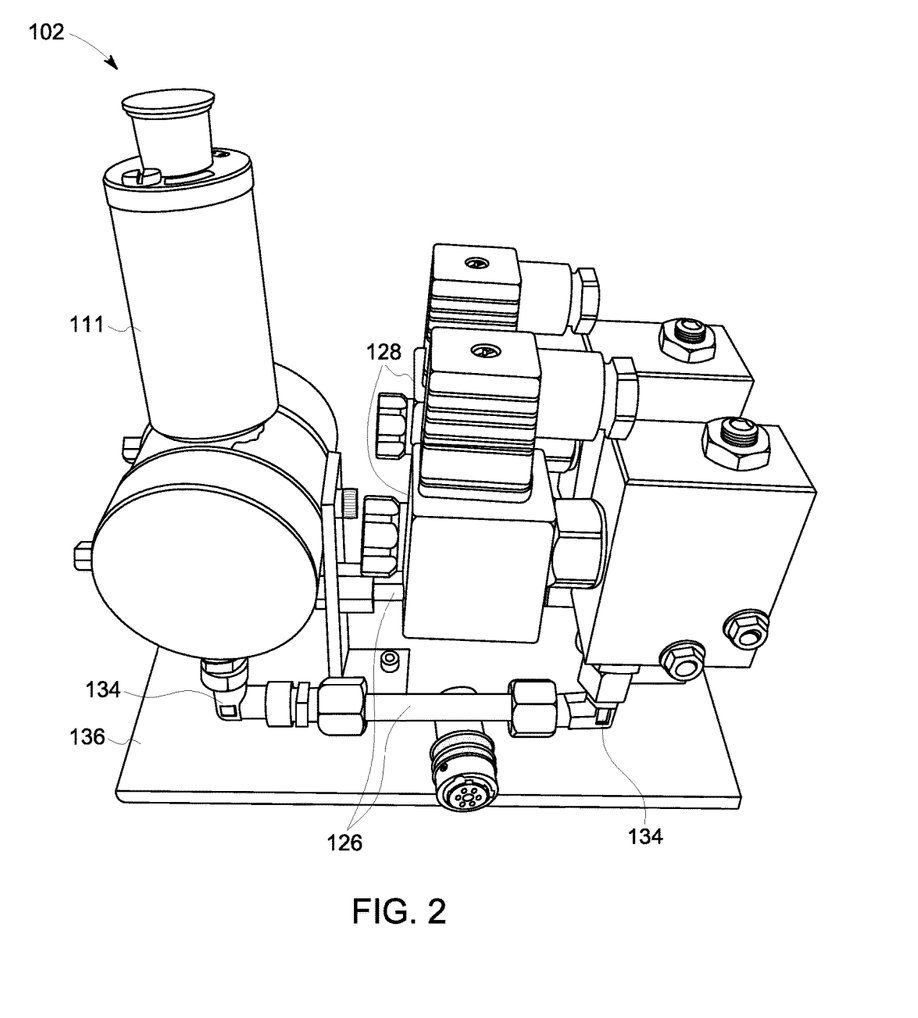
FIG. 2 is a perspective view of a flow measurement system of the fluid transport system shown in FIG. 1.
Figure 3:
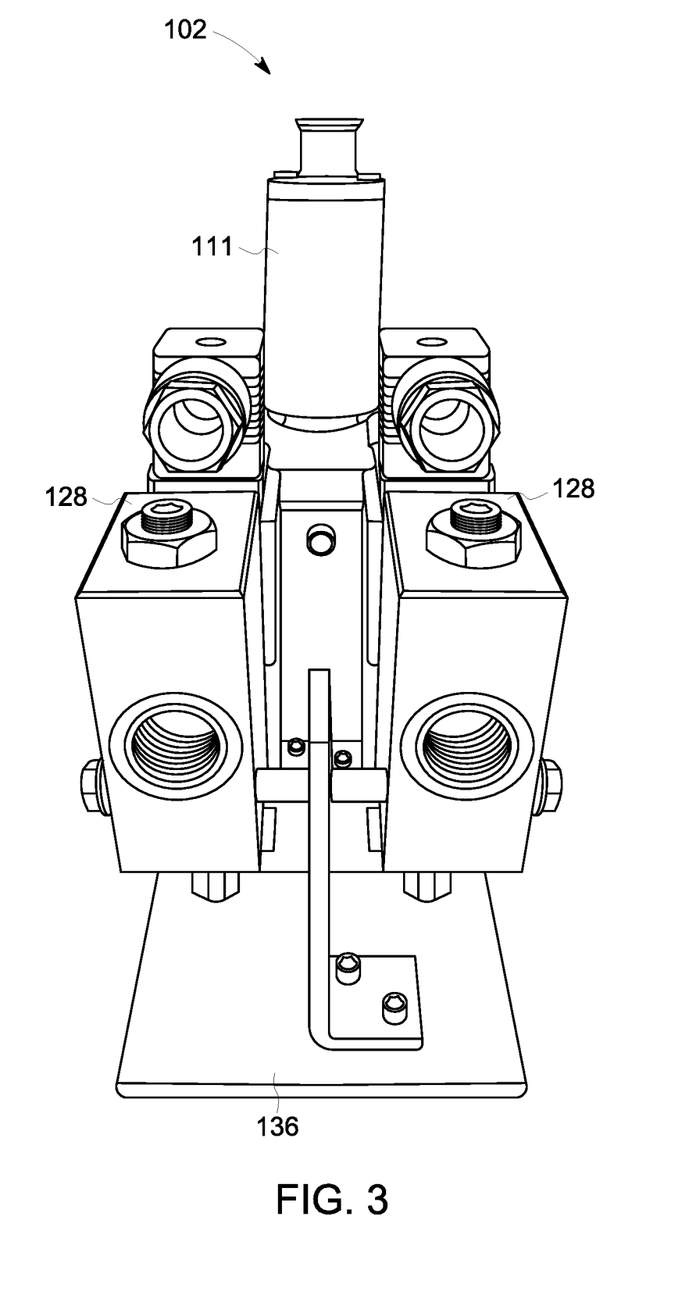
FIG. 3 is a front view of the flow measurement system shown in FIG. 3.

FIG. 2 is a perspective view of flow measurement system 102 of fluid transport system 100. FIG. 3 is a front view of flow measurement system 102. As shown in FIGS. 2 and 3, flow measurement system 102 includes two flexible tubes 126 and two purge valves 128. In alternative embodiments, flow measurement system 102 includes any flexible tubes 126 and purge valves 128 that enable flow measurement system 102 to operate as described herein. In the exemplary embodiment, a plurality of receivers 134 are coupled between flexible tubes 126 and purge system 116. Receivers 134 include rigid pipe portions to facilitate fluidly coupling purge valves 128 to flexible tubes 126. In alternative embodiments, receivers 134 are omitted. In the exemplary embodiment, flow measurement system 102 further includes a mount 136 to facilitate mounting flow measurement system 102 on housing 104. In alternative embodiments, flow measurement system 102 includes any components that enable flow measurement system to operate as described herein.

In the exemplary embodiment, sensor 111 withstands relatively high operating pressures of fluid transport system 100. For example, in some embodiments, sensor 111 operates with pressures greater than about 100 bars. In further embodiments, sensor 111 operates with pressures in a range between about 100 bars and about 300 bars. In the exemplary embodiment, sensor 111 includes a plurality of pressure transducers to facilitate determining a differential pressure of fluid 108. The pressure transducers are low-range pressure transducers configured to measure pressures in a relatively low-range. For example, in some embodiments, sensor 111 measures pressures less than about 10 bars. In further embodiments, sensor 111 measures pressures between about 0.03 bars and about 2 bars. In the exemplary embodiment, sensor 111 includes at least one absolute pressure transducer to facilitate calibrating flow measurement system 102. In some embodiments, the absolute pressure transducer is omitted and a differential pressure is determined using a nulling technique with a plurality of pressure transducers. In alternative embodiments, sensor 111 includes any sensors that enable flow measurement system 102 to operate as described herein.

With reference to FIG. 1, an exemplary method of measuring a flow characteristic of fluid 108 flowing through fluid transport system 100 is described. Probe 110 is positioned in passageway 106 such that probe 110 contacts fluid 108. Purge system 116 directs purge fluid 132 into flexible tubes 126. Flow measurement system 102 is purged by purge fluid 132 such that entrained gas is removed from flexible tubes 126 and probe 110. In some embodiments, purge fluid 132 is directed into flexible tubes 126 by opening purge valves 128. In some embodiments, purge fluid 132 is inhibited from flowing through probe 110 when purge fluid 132 flows through flexible tubes 126. After purge fluid 132 has flowed through flexible tubes 126 and probe 110, purge valves 128 are closed. Sensor 111 measures characteristic of fluid 108. In some embodiments, sensor 111 measures a differential pressure between fluid 108 in flexible tubes 126. In some embodiments, probe 110 and flexible tubes 126 are purged again and sensor 111 takes additional measurements of the fluid characteristics. Repeatedly purging probe 110 and flexible tubes 126 facilitates sensor 111 accurately measuring the flow characteristics.

Figure 4:
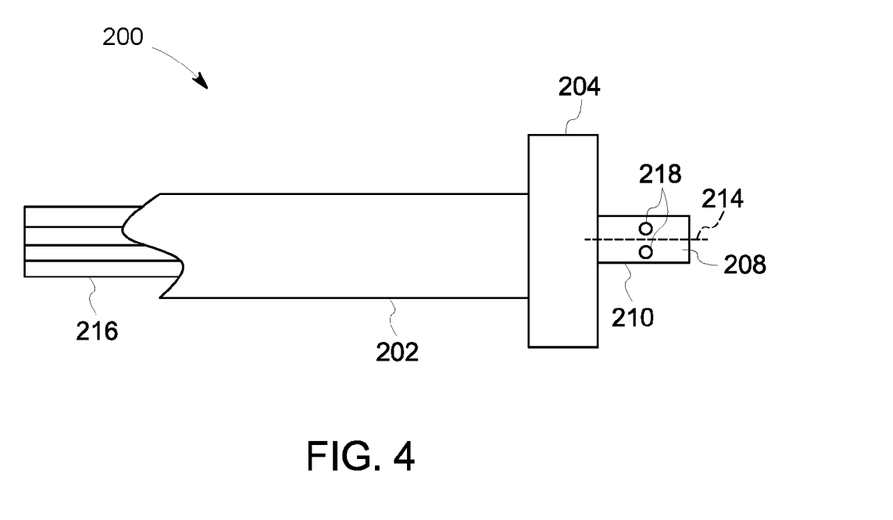
FIG. 4 is a side view of a probe for use with the flow measurement system shown in FIG. 2.
Figure 5:
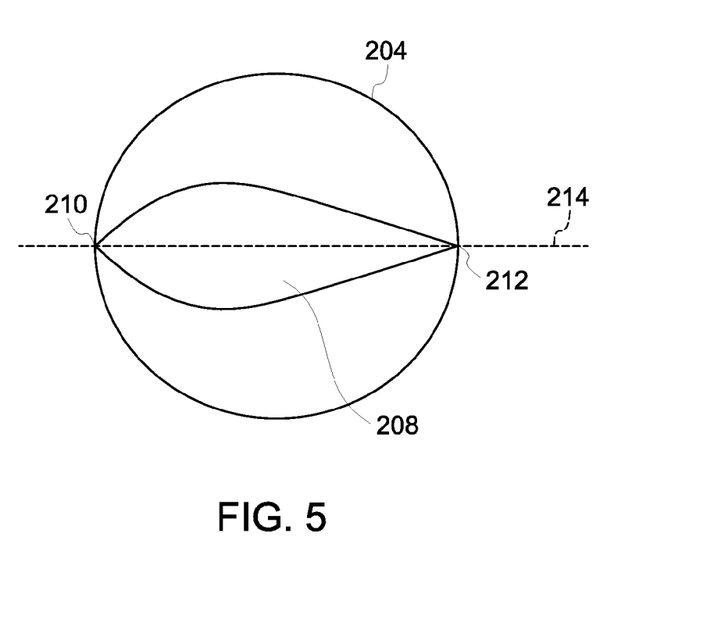
FIG. 5 is a front view of the probe shown in FIG. 4.

FIG. 4 is a side view of a probe 200 for use with flow measurement system 102 (shown in FIG. 1). FIG. 5 is a front view of probe 200. In the exemplary embodiment, probe 200 is a flow angle probe configured to facilitate determination of a flow angle. As used herein, the term "flow angle" refers to the angle between a flow direction and an axis. In alternative embodiments, probe 200 is any probe that enables flow measurement system 102 (shown in FIG. 1) to operate as described herein. In the exemplary embodiment, probe 200 includes an axel 202 having a first end 204 and a second end (not shown) opposite first end 204. An airfoil 208 is coupled to first end 204 of axel 202. Airfoil 208 has a leading edge portion 210 and a trailing edge portion 212. Airfoil 208 is symmetrical about a chord plane 214 extending from leading edge portion 210 to trailing edge portion 212. In alternative embodiments, airfoil 208 has any shape that enables probe 200 to operate as described herein.

In the exemplary embodiment, a plurality of conduits 216 extend within probe 200. Conduits 216 extend from second end (not shown) to a plurality of sensing ports 218 defined in leading edge portion 210 of airfoil 208. At least one of sensing ports 218 is located above chord plane 214 and at least one other of sensing ports 218 is located below chord plane 214. In the exemplary embodiment, probe 200 includes two sensing ports 218. In alternative embodiments, probe 200 includes any sensing ports 218 that enable probe 200 to operate as described herein. For example, in some embodiments, probe 200 includes at least one sensing ports 218 positioned adjacent chord plane 214.

With reference to FIGS. 1 and 4, during operation of fluid transport system 100, probe 200 is positioned in passageway 106 such that probe 200 contacts fluid 108 and fluid 108 flows into sensing ports 218 and through conduits 216. Sensor 111 is coupled to probe 200 and measures a characteristic of fluid 108. In some embodiments, sensor 111 measures a differential pressure of fluid 108. If the differential pressure is substantially non-zero, a sign of the differential pressure is determined. Probe 200 is rotated using rotator 112 such that the magnitude of the differential pressure is reduced. In some embodiments, the differential pressure is repeatedly measured and probe 200 is rotated until the differential pressure is zero. Once the differential pressure is substantially zero, a flow angle of fluid 108 is determined. In some embodiments, a position of rotator 112 is determined using an encoder (not shown) to facilitate determining the flow angle.

The above described fluid transport systems include a flow measurement system to measure characteristics of fluid flow through the fluid transport systems. The flow measurement system includes a probe, a sensor, a plurality of tubes, and a purge system. The purge system is coupled to the plurality of tubes and configured to direct a purge fluid through the plurality of tubes. In particular, the purge system directs liquid through the plurality of tubes to remove gas entrained in the plurality of tubes and facilitate the sensor accurately measuring characteristics of the fluid flow. In some embodiments, the sensor includes a pressure transducer that measures pressure accurately within a low-pressure range and withstands high operating pressures to facilitate measurement of a multiphase fluid flow through the fluid transport system.

An exemplary technical effect of the methods, systems, and apparatus described herein includes at least one of: (a) increasing the operating efficiency of fluid transport systems; (b) increasing the accuracy of flow measurement systems; (c) reducing erroneous readings of sensors in flow measurement systems; (d) providing flow measurement systems that withstand operating conditions of fluid transport systems having multiphase fluid flow; (e) facilitating measurement of erosion due to multiphase fluid flow; (f) identifying flow inhomogeneity in multiphase fluid flow; and (g) reducing cost of flow measurement systems for multiphase fluid flow.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of fluid transport systems that include a flow measurement system are described above in detail. The fluid transport systems that include a flow measurement system, and methods of operating such systems and devices are not limited to the specific embodiments described herein, but rather, components of systems and/or steps of the methods may be utilized independently and separately from other components and/or steps described herein. For example, the methods may also be used in combination with other systems, and are not limited to practice with only the fluid transport systems, and methods as described herein. Rather, the exemplary embodiment can be implemented and utilized in connection with many other applications requiring measurement of characteristics of fluid flow.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid transport system comprising:
   a housing defining a passageway for fluid to flow through said fluid transport system;
   a probe extending in the passageway, said probe comprising:
   a first end defining a plurality of sensing ports for the fluid to flow into said probe;
   a second end opposite said first end; and
   a plurality of conduits extending between said first end and said second end, said plurality of conduits coupled to said plurality of sensing ports such that the fluid flows through said plurality of conduits;
   a plurality of tubes coupled to said plurality of conduits such that the fluid flows through said plurality of tubes;
   a differential pressure sensor in fluid communication with said plurality of tubes such that said differential pressure sensor determines a differential pressure of the fluid in the plurality of tubes; and
   a purge system in fluid communication with said plurality of tubes, said purge system including a source of purge liquid, said purge system configured to direct the purge liquid through said plurality of tubes.

2. The fluid transport system in accordance with claim 1 further comprising a data acquisition system in electrical communication with said differential pressure sensor, said data acquisition system configured to receive a signal from said differential pressure sensor and convert the signal into a differential pressure value.

3. The fluid transport system in accordance with claim 1, wherein said purge system is configured to inhibit purge liquid flowing into said probe when said purge liquid is directed through said plurality of tubes.

4. The fluid transport system in accordance with claim 1, wherein said purge system further comprises:
   a first valve coupled to the source of the purge liquid, said first valve in fluid communication with said first flexible tube;
   a second valve coupled to the source of the purge liquid, said second valve in fluid communication with said second flexible tube, said first valve and said second valve selectively positionable from a closed position to an open position and from the open position to the closed position.

5. The fluid transport system in accordance with claim 1, wherein said purge system further comprises at least one valve in fluid communication with said plurality of tubes and the source of the purge liquid.

6. The fluid transport system in accordance with claim 5 further comprising a controller electrically coupled to said at least one valve, said controller configured to regulate said at least one valve from a closed position to an open position and from the open position to the closed position.

7. The fluid transport system in accordance with claim 1, wherein said differential pressure sensor comprises at least one low-range pressure transducer configured to measure pressures in a range between about 0.1 bars and about 2 bars.

8. The fluid transport system in accordance with claim 7 further comprising a plurality of differential pressure transducers.

9. A flow measurement system comprising:
   a probe configured to contact a flowing fluid, said probe comprising:
      a first end defining a plurality of sensing ports for the fluid to flow into said probe;
      a second end opposite said first end; and
      a plurality of conduits extending between said first end and said second end, said plurality of conduits coupled to said plurality of sensing ports such that the fluid flows through said plurality of conduits;
   a plurality of tubes coupled to said plurality of conduits such that the fluid flows through said plurality of tubes;
   a differential pressure sensor in fluid communication with said plurality of tubes such that said differential pressure sensor determines a differential pressure of the fluid in the plurality of tubes; and
   a purge system in fluid communication with said plurality of tubes, said purge system including a source of purge liquid, said purge system configured to direct the purge liquid through said plurality of tubes.

10. The flow measurement system in accordance with claim 9, wherein said differential pressure sensor comprises a plurality of differential pressure transducers.

11. The flow measurement system in accordance with claim 9, wherein said purge system is configured to inhibit purge liquid flowing through said probe when said purge liquid is directed through said plurality of tubes.

12. The flow measurement system in accordance with claim 9, wherein said purge system further comprises:
   a first valve in fluid communication with a first tube of said plurality of tubes and in fluid communication with said source of the purge liquid; and
   a second valve in fluid communication with a second tube of said plurality of tubes and in fluid communication with said source of the purge liquid.

13. The flow measurement system in accordance with claim 12 further comprising a controller electrically coupled to said first valve and said second valve, said controller configured to regulate said first valve and said second valve from a closed position to an open position and from the open position to the closed position.

14. A method of measuring a characteristic of a fluid flow, said method comprising:
   positioning a probe in the fluid flow such that fluid flow enters a plurality of conduits of the probe through a plurality of sensor ports;
   purging a plurality of tubes in fluid communication with the plurality of conduits with a purge liquid from a purge liquid source; and
   measuring a differential pressure between the fluid in the plurality of tubes using a differential pressure sensor in fluid communication with the plurality of tubes.

15. The method in accordance with claim 14, wherein purging the plurality of tubes comprises:
   opening a first valve in fluid communication with a first tube of the plurality of tubes and the purge liquid source;
   opening a second valve in fluid communication with a second tube of the plurality of tubes and the purge liquid source; and
   closing the first valve and the second valve.

16. The method in accordance with claim 14, wherein measuring a differential pressure between the fluid in the plurality of tubes comprises measuring a differential pressure between the fluid in the plurality of tubes as the plurality of tubes are purged with the purge liquid.

17. The method in accordance with claim 14, wherein purging the plurality of tubes comprises directing the purge liquid at a greater pressure than the fluid through the conduits and the plurality of tubes.

18. The method in accordance with claim 14, wherein purging the plurality of tubes and measuring a differential pressure are performed a plurality of times in a repeating cycle.

19. The method in accordance with claim 14 further comprising determining the flow angle of the fluid flow based on the measured differential pressure.

20. The method in accordance with claim 19, wherein determining the flow angle of the fluid comprises measuring the position of a rotator coupled to the probe and using an encoder to convert the measurement into the flow angle.

* * * * *